United States Patent [19]
Inoue et al.

[11] Patent Number: 5,831,600
[45] Date of Patent: Nov. 3, 1998

[54] COORDINATE INPUT DEVICE

[75] Inventors: Kinya Inoue; Hiroshi Shigetaka, both of Fukushima-ken, Japan

[73] Assignee: ALPS Electric Co, Ltd., Japan

[21] Appl. No.: 867,134

[22] Filed: Jun. 2, 1997

[30] Foreign Application Priority Data

Jun. 4, 1996 [JP] Japan ..................................... 8-141787

[51] Int. Cl.$^6$ .................................................. G09G 5/00
[52] U.S. Cl. .......................... 345/173; 345/156; 345/174; 178/18; 178/19
[58] Field of Search ..................................... 345/173, 174, 345/179, 156, 177, 471 XY; 178/18, 19

[56] References Cited

U.S. PATENT DOCUMENTS

| | | | |
|---|---|---|---|
| 4,476,463 | 10/1984 | Ng. et al. ................................. | 345/173 |
| 4,698,461 | 10/1987 | Meadows et al. ......................... | 178/19 |
| 5,305,017 | 4/1994 | Gerpheide ................................. | 345/174 |
| 5,359,156 | 10/1994 | Chan et al. ................................ | 178/19 |

*Primary Examiner*—Jeffery A. Hofsass
*Assistant Examiner*—Julie Lieu
*Attorney, Agent, or Firm*—Brinks Hofer Gilson & Lione

[57] ABSTRACT

There is provided a coordinate input device in which when the coordinate position of a contact portion on a tablet by a coordinate input object is to be detected, influence of external noise is minimized to improve the reliability of detection of the coordinate position. The coordinate input device comprises a tablet scanned by one scan signal selected from a plurality of scan signals having different frequencies, and a coordinate data generation section for generating coordinate data representing a coordinate position of a contact portion when a coordinate input object is brought into contact with the tablet, wherein when the tablet is to be scanned with a scan signal, the coordinate data formation section sequentially selects the plurality of scan signals at least once a selecting operation, measures levels of noise included in data output from the tablet each time the selecting operation is performed, and then uses a scan signal representing a minimum noise level of the measured noise levels to scan the tablet.

2 Claims, 4 Drawing Sheets

COORDINATE INPUT DEVICE

BACKGROUND OF THE INVENTION

1. Field of the Invention

The present invention relates to a coordinate input device and, more particularly, to a coordinate input device in which when a coordinate input object is brought into contact with an operation area to operate the operation area, influence of external noise on coordinate data representing the coordinate position of a coordinate input object contact portion is minimized.

2. Description of the Related Art

In recent years, a coordinate input device used by the following manner has developed. That is, when a coordinate input object such as an input pen or a finger is brought into contact with a desired position of a tablet-type operation area, coordinate data representing the coordinate positions of the contact portions are sequentially output to display the contact positions of the coordinate input object.

Here, FIG. 4 is a block diagram showing a known coordinate input device.

As shown in FIG. 4, the coordinate input device is constituted by a tablet 51, a coordinate input object 52 such as an input pen or a finger of an operator, a coordinate data generator 53, and a signal processor 54 such as a personal computer (PC).

The tablet 51 is arranged to be perpendicular to the front and rear surfaces of a substrate (not shown), and is constituted by a plurality of (N) electrodes 55 ($X_1$ to $X_N$) and a plurality of (M) electrodes 56 ($Y_1$ to $Y_M$) which are arranged in a matrix, a protective film (not shown) adhered to the upper surface of the substrate, and the like. The input pen 52 has a tip and a surface which consist of a conductive material. The coordinate data generator 53 is constituted by an X-axis side multiplexer 57, a Y-axis side multiplexer 58, a first amplification circuit 59, a first filter circuit 60, an analog/digital converter (A/D) 61, a controller (CPU) 62, an oscillation circuit 63, and an analog switch 64. In this case, the X-axis side multiplexer 57 has a plurality of (N) switches $S_1$ to $S_N$ which are arranged in parallel in each other. One ends of the switches $S_1$ to $S_N$ are connected to one ends of the X electrodes 55 ($X_1$ to $X_N$), respectively, and the other ends of the switches $S_1$ to $S_N$ are connected to the analog switch 64 in common. The Y-axis side multiplexer 58 has a plurality of (M) switches $S_1$ to $S_M$ which are arranged in parallel. One ends of the switches $S_1$ to $S_M$ are connected to one ends of the Y electrodes 56 ($Y_1$ to $Y_M$), respectively, and the other ends of the switches $S_1$ to $S_M$ are connected to the input terminal of the first amplification circuit 59 in common. One input terminal of the first filter circuit 60 is connected to the output terminal of the first amplification circuit 59, and the output terminal of the first filter circuit 60 is connected to the input terminal of the A/D converter 61. The CPU 62 has a data output terminal connected to the signal processor 54, and has a control terminal connected to the control terminal of the analog switch 64.

An operation of a known coordinate input device having the above arrangement will be briefly described below.

A case wherein the tablet 51 is operated with a finger 52 of an operator will be described. An oscillation signal from the oscillation circuit 63 is supplied to the X-axis side multiplexer 57. At this time, the switches $S_1$ to $S_N$ of the X-axis side multiplexer 57 and the switches $S_1$ to $S_M$ of the Y-axis side multiplexer 58 are ON/OFF-controlled with a control signal supplied from the CPU 62. The manner of this control is as follows. That is, the switch $S_1$ of the X-axis side multiplexer 57 is turned on first, and the switches $S_1$ to $S_M$ of the Y-axis side multiplexer 58 are sequentially turned on. The switch $S_2$ of the X-axis side multiplexer 57 is turned on, the switches $S_1$ to $S_M$ of the Y-axis side multiplexer 58 are sequentially turned on. Similarly, with respect to the switches $S_3$ to $S_M$ of the X-axis side multiplexer 57, one of these switches is turned on, and the switches $S_1$ to $S_M$ of the Y-axis side multiplexer 58 are sequentially turned on. With the above scanning operation, oscillation signals from the oscillation circuit 63 are sequentially supplied to the X electrodes 55 ($X_1$ to $X_N$), and the signal voltages of the oscillation signals generate electrostatic capacitors between the X electrodes 55 ($X_1$ to $X_N$) and the Y electrodes 56 ($Y_1$ to $Y_M$).

Here, when the finger 52 is brought into contact with a desired position on the tablet 51, some of electric lines of force generated by a capacitor near the contact position are absorbed by the finger 52, the capacitance of the electrostatic capacitor located at this portion, and the signal voltage extracted from the portion decreases according to a decrease in the capacitance. With the scanning operation of the X-axis side multiplexer 57 and the Y-axis side multiplexer 58, the signal voltages output from the Y electrodes 56 ($Y_1$ to $Y_M$) are amplified by the first amplification circuit 59, and the signal voltages from which noise components are removed by the first filter circuit 60 are supplied to the A/D 61. The A/D 61 converts the input signal voltages into digital signals, and the CPU 62 loads the digital signals. The CPU 62 calculates the Y and X electrodes 56 and 55 each having the smallest signal voltage value on the basis of the loaded digital signals to detect a contact position of the finger 52 on the tablet 51.

In this manner, when detection for the X- and Y-coordinates of the position where the finger 52 touches on the tablet 51 is made, the CPU 62 sends the detection data to the signal processor 54. In the signal processor 54, a cursor corresponding to the contact position of the finger 52 and displayed on the display unit is moved.

When the tablet 51 is operated with the input pen 52, a generated electrostatic capacitance is absorbed by a hand holding the finger 52 through the input pen 52 to detect the X and Y coordinates of the finger 52 as described above.

In this known coordinate input apparatus, when the coordinate position of the contact portion on the tablet (scanning area) 51 is detected by a coordinate input object such as the input pen 52, the switches $S_1$ to $S_N$ of the X-axis side multiplexer 57 are sequentially turned on to scan the X electrodes 55 ($X_1$ to $X_N$), and the switches $S_1$ to $S_M$ of the Y-axis side multiplexer 58 are sequentially turned on to scan the Y electrodes 56 ($Y_1$ to $Y_M$). Scan signals used when these scanning operations have specific frequencies, respectively.

In the known coordinate input device, when signal voltages are read from the tablet 51, external noise is superposed on the read signal voltages. In this case, most of the external noise superposed on the signal voltages is removed by the first filter circuit 60 or a second filter circuit 66. However, when the external noise frequency is approximate to the frequency of the scan signal, the external noise cannot be removed by the first filter circuit 60 or the second filter circuit 66, and the signal voltages are input to the A/D 61 and the CPU 62 without removing the external noise from the signal voltages. For this reason, the external noise adversely affects detection of a coordinate position by the CPU 62, and the reliability of detection of the coordinate position is degraded.

SUMMARY OF THE INVENTION

The present invention has been made to solve the problem, and has as its object to provide a coordinate input device in which when a coordinate position of a contact portion on an operation area by a coordinate input object is to be detected, influence of external noise is minimized to improve the reliability of detection of the coordinate position.

In order to achieve the above object, a coordinate input device according to the present invention comprises means for preparing a plurality of scan signals having frequencies different from those of scan signals for scanning an operation area, sequentially scanning the operation area by the plurality of scan signals, measuring external noise superposed on data output from the operation area each time the scan signals are changed, and then selecting a scan signal on which external noise at the minimum level is superposed to scan the operation area.

According to this means, when data is output from the scanned operation area, the scan signal on which the external noise at the minimum level is superposed can be selected. For this reason, influence of the external noise can be minimized, and the reliability of detection of the coordinate position can be improved.

DESCRIPTION OF THE PREFERRED EMBODIMENT

According to an embodiment of the present invention, a coordinate input device comprises an operation area scanned by one scan signal selected from a plurality of scan signals having different frequencies, and coordinate data formation means for generating coordinate data representing a coordinate position of a contact portion when a coordinate input object is brought into contact with the operation area, wherein the coordinate data formation means sequentially selects the plurality of scan signals at least once a selecting operation to scan the operation area, measures levels of noise included in data output from the operation area each time the selecting operation is performed, and then uses a scan signal representing a minimum noise level of the measured noise levels to scan the operation area.

At this time, the measured noise levels are stored in a memory in correspondence with the frequencies of the sequentially selected scan signals.

According to this embodiment, the operation area to be scanned by a scan signal is scanned such that a plurality of scan signals having different frequencies are sequentially selected at least once a selecting operation, and, at this time, levels of external noise superposed on data output from the operation area are measured. Thereafter, the operation area is scanned by a scan signal having external noise at the minimum level. For this reason, when the coordinate input object is brought into contact with the operation area, and the coordinate position of the contact portion is to be detected, influence of the external noise superposed on the coordinate data can be minimized. As a result, the reliability of detection of the coordinate position can be improved.

EMBODIMENT

An embodiment of the present invention will be described below with reference to the accompanying drawings.

Figure 1:
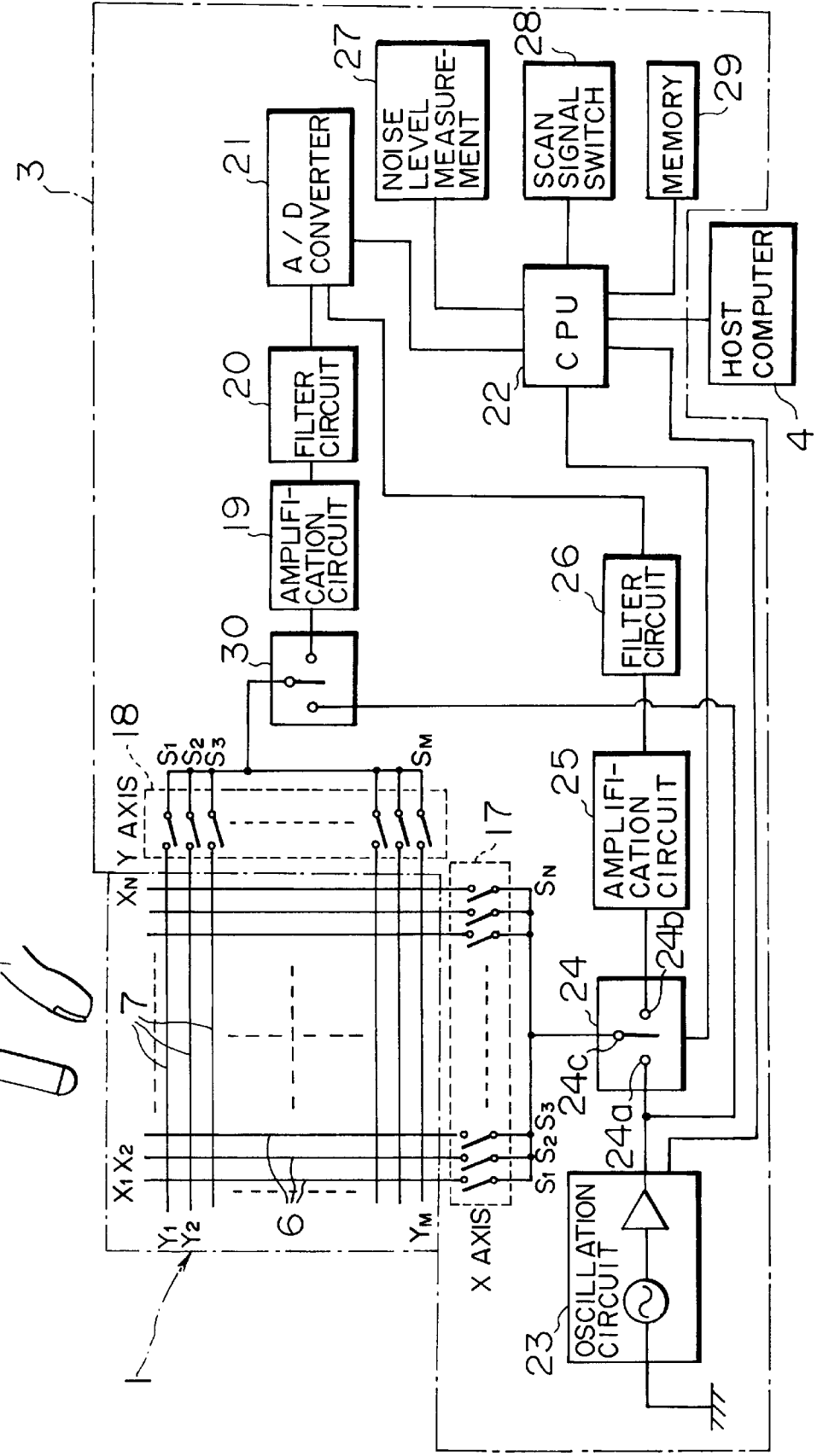
FIG. 1 is a block diagram showing a coordinate input device according to an embodiment of the present invention.
Figure 2:
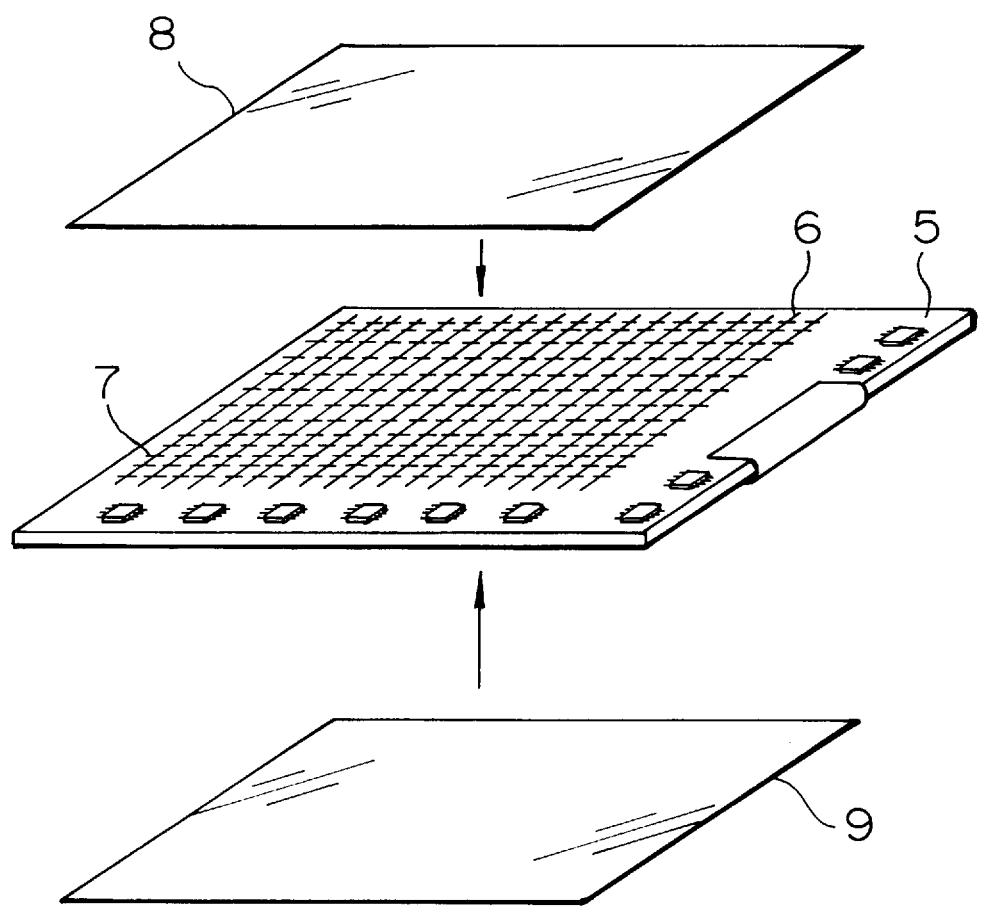
FIG. 2 is a development showing an arrangement of a tablet used in the coordinate input device shown in FIG. 1.

FIG. 1 is a block diagram showing a coordinate input device according to an embodiment of the present invention. FIG. 2 is a development showing an arrangement of a tablet used in the coordinate input device shown in FIG. 1.

As shown in FIG. 1, the coordinate input device is constituted by a tablet (operation area) 1, a coordinate input object 2 such as an input pen 2-1 or a finger 2-2 of an operator, a coordinate data generation section 3, and a signal processor 4 such as a personal computer (PC).

The tablet 1, as shown in FIG. 2, is constituted by a film substrate 5, a plurality of (N) parallel X electrodes 6 ($X_1$ to $X_N$) formed on the upper surface of the film substrate 5, a plurality of (M) parallel Y electrodes 7 ($Y_1$ to $Y_M$) which are adhered to the lower surface of the film substrate 5 and arranged perpendicularly to the X electrodes 6 ($X_1$ to $X_N$), a protective film 8 adhered to the upper surface of the film substrate 5, and a shield film 9 adhered to the lower surface of the film substrate 5. The tablet 1 is incorporated in the keyboard of the personal computer to function as a mouse.

The coordinate data generation section 3, as shown in FIG. 1, is constituted by an X-axis side multiplexer 17 having a plurality of (N) switches $S_1$ to $S_N$ arranged in parallel, a Y-axis side multiplexer 18 having a plurality of (M) switches $S_1$ to $S_M$ arranged in parallel, a first amplification circuit 19, a first filter circuit 20, an analog/digital converter (A/D) 21, a controller (CPU) 22, an oscillation circuit 23, a first drive selection circuit 24 constituted by a switch, a second drive selection circuit 30, a second amplification circuit 25, a second filter circuit 26, noise level measurement section 27, a scan signal switching section 28, and a memory 29. In this case, the noise level measurement section 27 measures the noise amount and noise level (the maximum value of the noise amount—the minimum value of the noise amount) of external noise superposed on a digital signal supplied to the filter constant setting section 22, and the scan signal switching section 28 switches a scan signal output from the CPU 22 to signals having a plurality of frequencies, e.g., any one of first to eighth scan signals having frequencies f1 to f8. The memory 29 stores the noise levels measured by the noise level measurement section 27 in correspondence with the frequencies f1 to f8 when the scan signal is switched to the first to eighth scan signals. In the coordinate data generation section 3, the first and second drive selection circuits 24 and 30 are added, and the noise level measurement section 27, the scan signal switching section 28, and the memory 29 are connected to the CPU 22.

An operation of the coordinate input device according to this embodiment with the above arrangement will be described below.

In the coordinate input device according to this embodiment, the frequency of a scan signal for turning on all the switches $S_1$ to $S_N$ of the X-axis side multiplexer 17 on to scan the X electrodes 6 ($X_1$ to $X_N$) of the tablet 1 is set, and the switches $S_1$ to $S_M$ of the Y-axis side multiplexer 18 are sequentially turned on. The frequency of a scan signal for turning on all the switches $S_1$ to $S_M$ of the Y-axis side multiplexer 18 to scan the Y electrodes 7 ($Y_1$ to $Y_M$) of the tablet 1 is set to be equal to the frequency of the scan signal for the X axis, and the switches $S_1$ to $S_N$ of the X-axis side multiplexer 17 are sequentially turned on.

More specifically, the oscillation circuit 23 outputs a scan signal having a frequency determined by a control signal from the CPU 22, and outputs the scan signal to the X-axis side multiplexer 17 first. In this case, the amplification circuit 25 is in an OFF state by a switching operation of the first drive selection circuit 24.

On the other hand, connection from the oscillation circuit 23 is turned off by the second drive selection circuit 30, and the first amplification circuit 19 is connected to the Y-axis side multiplexer 18.

In the X-axis side multiplexer 17, the switches $S_1$ to $S_N$ are sequentially turned on by a control signal from the CPU 22, and a voltage is extracted to the amplification circuit 19.

The first drive selection circuit 24 is turned off by a control signal from the CPU 22 together with the oscillation circuit 23, and the X-axis side multiplexer 17 and the amplification circuit 25 are connected to each other. The second drive selection circuit 30 is connected to the oscillation circuit 23 and outputs a scan signal from the oscillation circuit 23 to the Y-axis side multiplexer 18. The Y-axis side multiplexer 18 and the amplification circuit 19 are turned off.

Figure 3:
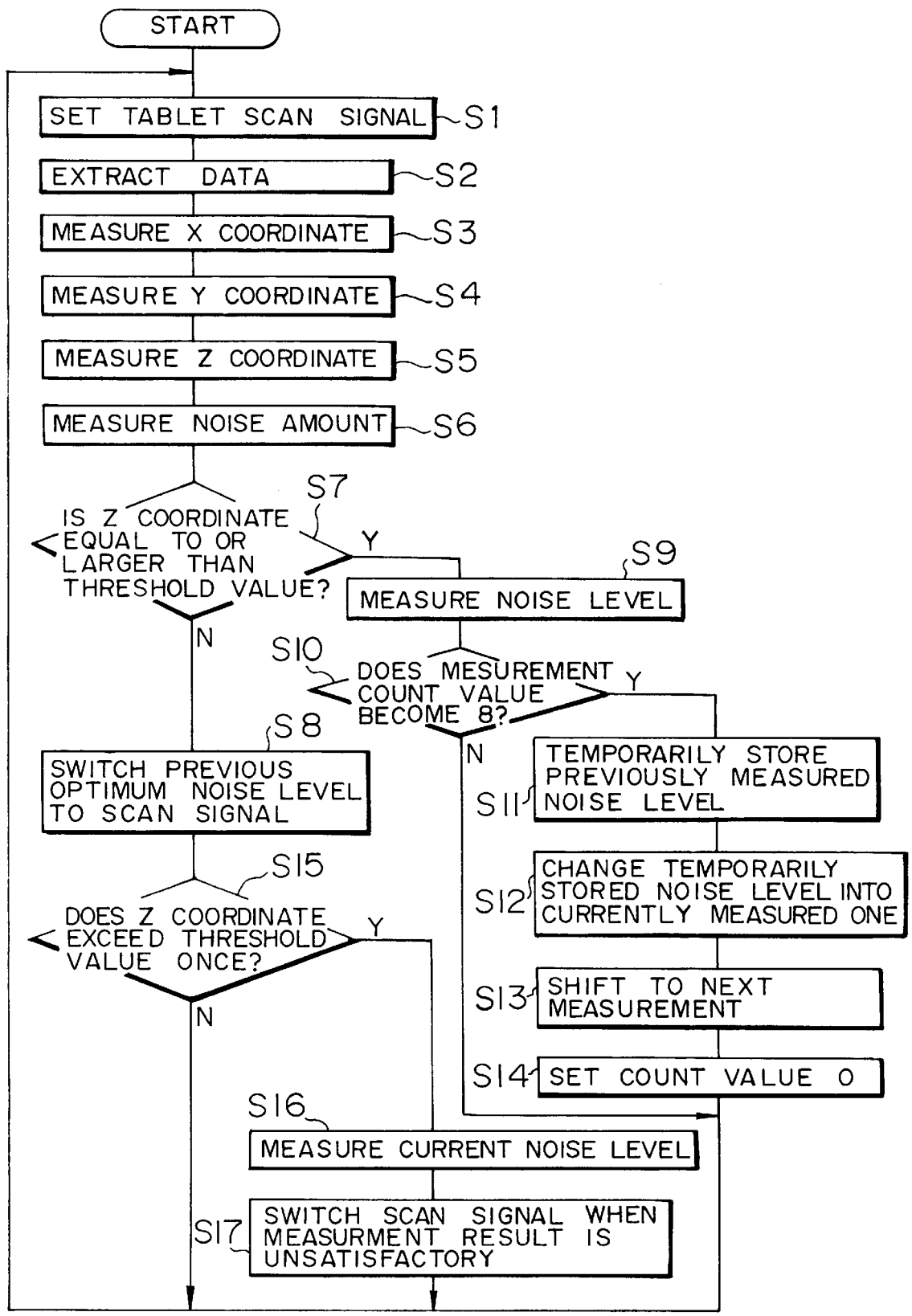
FIG. 3 is a flow chart showing the details of an operation performed when the frequencies of scan signals are sequentially updated in the coordinate input device shown in FIG. 1.
Figure 4:
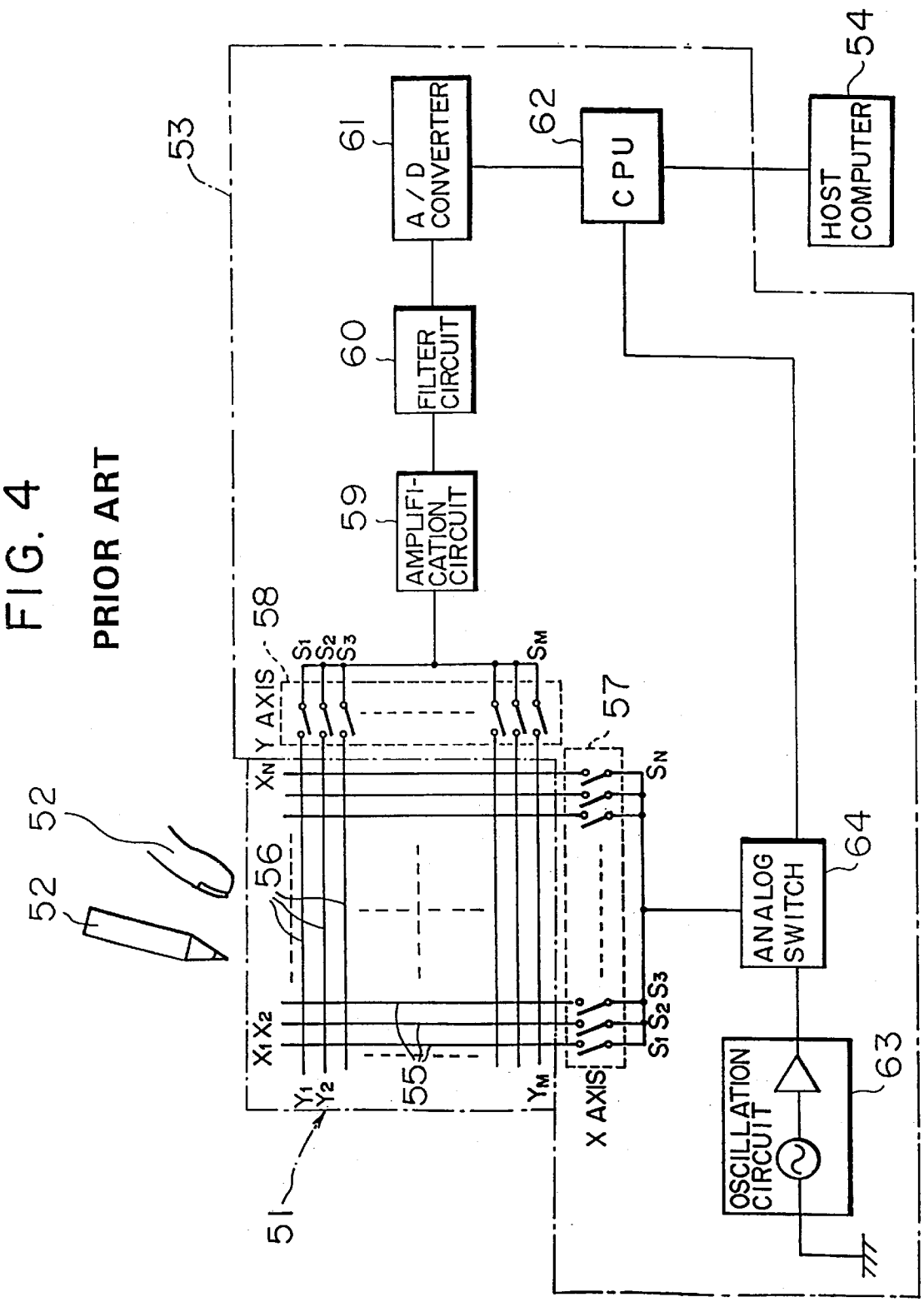
FIG. 4 is a block diagram showing a conventional coordinate input device.

Here, an operation performed in a case wherein the frequencies of scan signals for scanning the X electrodes 6 ($X_1$ to $X_N$) and/or the frequencies of scan signals for scanning the Y electrodes 7 ($Y_1$ to $Y_M$) are sequentially changed will be described below with reference to the flow chart shown in FIG. 3, i.e., the flow chart showing the details of an operation performed when the frequencies of scan signals are sequentially changed in the coordinate input device according to this embodiment.

In step S1, the CPU 22 generates, of the first to eighth scan signals which can be generated, one scan signal having a minimum noise level in previous noise level measurement, e.g., the first scan signal, and sequentially turns on the switches $S_1$ to $S_N$ of the X-axis side multiplexer 17 to scan the X electrodes 6 ($X_1$ to $X_N$) of the tablet 1.

In step S2, signal voltages obtained at the Y electrodes 7 ($Y_1$ to $Y_M$) of the tablet 1 are sequentially extracted through the Y-axis side multiplexer 18 whether the tablet 1 is operated by the input pen 2-1 or not. The signal voltages are amplified by the first amplification circuit 19, and the noise component of the signal voltages are removed by the first filter circuit 20. The signal voltages are converted into digital signals by the A/D 21. The resultant digital signals are loaded on the CPU 22.

In step S3, the CPU 22 measures the X coordinate of the tablet 1 on the basis of the loaded digital signals.

In step S4, the CPU 22 measures the Y coordinate of the table 1 on the basis of the loaded digital signals.

In step S5, on the basis of the loaded digital signals, the CPU 22 measures a Z coordinate representing that the input pen 2-1 is close to or brought into contact with the tablet 1.

In step S6, the CPU 22 supplies the loaded digital signals to the noise level measurement section 27 to measure an amount of external noise superposed on the digital signals.

Subsequently, in step S7, the CPU 22 checks whether the Z coordinate measured in step S5 exceeds a threshold value, i.e., whether the input pen 2-1 is close to or brought into contact with the tablet 1. If it is determined that the Z coordinate does not exceed the threshold value (N), the flow shifts to next step S8. If it is determined that the Z coordinate exceeds the threshold value (Y), the flow shifts to other step S9.

In step S8, the CPU 22 drives the scan signal switching section 28 to generate one scan signal having a minimum noise level in the previous noise level measurement, e.g., the second scan signal, as a scan signal for sequentially turning on the switches $S_1$ to $S_N$ of the X-axis side multiplexer 17. Thereafter, the CPU 22 sequentially turns on the switches $S_1$ to $S_N$ of the X-axis side multiplexer 17 to scan the X electrodes 6 ($X_1$ to $X_N$) of the tablet 1.

In step S9, the CPU 22 supplies the loaded digital signals to the noise level measurement section 27 and measures a noise level in the scan signal, i.e., a noise level obtained by subtracting the minimum noise level from the maximum noise level.

In step S10, the CPU 22 checks whether the number of measurements of noise levels in step S9, i.e., a measurement count is equal to the total number (8) of the first to eighth scan signals. If it is determined that the measurement count is equal to 8 (Y), the flow shifts to step S11. If it is determined that the measurement count is not equal to 8 (N), the flow returns to the first step (step S1) to execute the processes in steps following step S1 again.

In step S11, on the basis of the digital signals supplied to the noise level measurement section 27, the CPU 22 temporarily stores noise levels in a scanning operation (sequential change cycles of previous scan signals) by the previous first to eighth scan signals measured by the noise level measurement section 27 in a temporary storage section of the memory 29 in correspondence with the frequencies f1 to f8 of the first to eighth scan signals.

In step S12, the CPU 22 converts the noise levels in the sequential change cycles of the previous scan signals temporarily stored in the temporary storage section of the memory 29 are converted into noise levels in sequential change cycles of current scan signals.

Subsequently, in step S13, the CPU 22 causes sequential change cycles of scan signals for sequentially changing the scan signals of the X-axis side multiplexer 17 to shift from sequential change cycles of the current scan signals to sequential change cycles of the next scan signals.

In step S14, the CPU 22 sets the number of measurements of noise levels, i.e., a measurement count, to be 0 at step S9. Upon completion of this setting, the flow returns to step S1 to execute the processes in steps following step S1 again.

In step S15, the CPU 22 selects one scan signal having the minimum noise level in the previous stage, e.g., the second scan signal, and sequentially turns on the switches $S_1$ to $S_N$ of the X-axis side multiplexer 17 by the second scan signal. In this state, when the CPU 22 scans the X electrodes 6 ($X_1$ to $X_N$) of the tablet 1, the CPU 22 checks whether the Z coordinate exceeds the threshold value once (or 0 times). If it is determined that the Z coordinate exceeds the threshold value once (Y), the flow shifts to next step S16. If it is determined that the Z coordinate exceeds the threshold value 0 times (N), the flow returns to the first step, i.e., step S1, to execute the processes in steps following step S1 again.

In step S16, the CPU 22 supplies the digital signals to the noise level measurement section 27 to measure a current noise level. If the measurement index of the noise level at this time is worst, i.e., 255 (0 is the best, the measurement index becomes worse with an increase in integer value, and 255 is worst) or is approximate to 255, the flow immediately shifts to next step S17.

In step S17, the CPU 22 drives the scan signal switching section 28 to generate another scan signal, e.g., the third scan signal, in place of one scan signal selectively generated in step S8, e.g., the second scan signal, as a scan signal for sequentially turning on the switches $S_1$ to $S_N$ of the X-axis side multiplexer 17. When the third scan signal is generated, the flow returns to step S1 to execute the processes in steps following step S1 again.

In this manner, according to this embodiment, when the tablet (operation area) 1 is to be scanned by a scan signal, a plurality of scan signals having different frequencies are sequentially selected at least once a selecting operation as scan signals, levels of external noise superposed on data output from the tablet 1 in a scanning operation by the selected scan signal are measured. Thereafter, the tablet 1 is scanned by a scan signal having external noise at the minimum level. For this reason, when the coordinate input object 2 is brought into contact with the tablet 1, and the coordinate position of the contact portion is to be detected, influence of the external noise superposed on the coordinate data can be minimized. As a result, the reliability of detection of the coordinate position can be improved.

The above embodiment has been described by using a case wherein 8 scan signals, i.e., the first to eighth scan signals are used. However, the total number of scan signals is not limited to 8, and a number other than 8 may be selected as the total number of scan signals as a matter of course.

As has been described above, according to the present invention, when an operation area is to be scanned by a scan signal, a plurality of scan signals having different frequencies are sequentially selected at least once a selecting operation as scan signals, the operation area is scanned by the selected scan signal to obtain data, and the level of external noise superposed on the obtained data is measured. Thereafter, the operation area is scanned by a scan signal having external noise at the minimum level. For this reason, when the coordinate input object is brought into contact with the operation area, and the coordinate position of the contact portion is to be detected, influence of the external noise superposed on the coordinate data can be minimized. As a result, the reliability of detection of the coordinate position can be advantageously improved.

What is claimed is:

1. A coordinate input device comprising an operation area scanned by one scan signal selected from a plurality of scan signals having different frequencies, and coordinate data formation means for generating coordinate data representing a coordinate position of a contact portion when a coordinate input object is brought into contact with said operation area, characterized in that said coordinate data formation means sequentially selects the plurality of scan signals at least once a selecting operation to scan said operation area, measures levels of noise included in data output from said operation area each time the selecting operation is performed, and then uses a scan signal representing a minimum noise level of the measured noise levels to scan said operation area.

2. A coordinate input device according to claim 1, characterized in that the measured noise levels are stored in a memory in correspondence with the frequencies of the sequentially selected scan signals.

* * * * *